(12) United States Patent
Byttebier et al.

(10) Patent No.: US 8,504,256 B2
(45) Date of Patent: Aug. 6, 2013

(54) HARVESTER CRUISE CONTROL

(75) Inventors: Ward M. Byttebier, Zwevegem (BE); Daenio Cleodolphi, Sao Paulo (BR); Dries Delie, Poelkapelle (BE); Leandro Godoy, Sao Paulo (BR)

(73) Assignee: CNH America LLC, New Holland, PA (US)

( * ) Notice: Subject to any disclaimer, the term of this patent is extended or adjusted under 35 U.S.C. 154(b) by 0 days.

(21) Appl. No.: 13/345,453

(22) Filed: Jan. 6, 2012

(65) Prior Publication Data

US 2013/0179043 A1    Jul. 11, 2013

(51) Int. Cl.
  *G06F 7/70*     (2006.01)
  *G06F 19/00*    (2006.01)
  *G06G 7/00*     (2006.01)

(52) U.S. Cl.
  USPC .......................................... 701/50; 56/10.2 R

(58) Field of Classification Search
  USPC ............... 701/50, 36, 1, 54, 99, 110, 84, 93, 701/103, 106; 56/10.2 R, DIG. 15, 13.5, 56/10.2 G, 10.2 H, 10.5, 11.1, 14.7; 477/111, 477/119; 460/1, 6, 116
  See application file for complete search history.

(56) References Cited

U.S. PATENT DOCUMENTS

| | | | |
|---|---|---|---|
| 3,481,122 A * | 12/1969 | Pool et al. | 460/6 |
| 3,546,860 A | 12/1970 | Pool et al. | |
| 4,458,471 A * | 7/1984 | Herwig | 56/10.2 G |
| 4,522,553 A | 6/1985 | Nelson et al. | |
| 4,727,710 A * | 3/1988 | Kuhn | 56/10.2 G |
| 5,138,819 A * | 8/1992 | Andre | 56/10.2 R |
| 5,878,557 A | 3/1999 | Wyffels et al. | |
| 6,073,428 A | 6/2000 | Diekhans | |
| 6,336,051 B1 * | 1/2002 | Pangels et al. | 700/50 |
| 6,397,571 B1 | 6/2002 | Ehrecke | |
| 6,591,591 B2 | 7/2003 | Coers et al. | |
| 6,616,527 B2 | 9/2003 | Shinners et al. | |
| 6,834,484 B2 | 12/2004 | Coers et al. | |
| 6,865,870 B2 | 3/2005 | Heisey | |
| 7,261,632 B2 | 8/2007 | Pirro et al. | |
| 7,370,458 B2 | 5/2008 | Matsuda et al. | |
| 7,648,413 B2 | 1/2010 | Duquesne et al. | |
| 2006/0123757 A1 | 6/2006 | Baumgarten et al. | |
| 2008/0034720 A1 | 2/2008 | Helfrich et al. | |
| 2008/0155953 A1* | 7/2008 | Cleodolphi | 56/10.2 E |
| 2008/0172997 A1 | 7/2008 | Hugenroth | |
| 2009/0107102 A1 * | 4/2009 | Biziorek | 56/341 |

FOREIGN PATENT DOCUMENTS

| | | | | |
|---|---|---|---|---|
| GB | 2205179 A | * 11/1988 | | |
| WO | 0126807 | 3/2001 | | |
| WO | WO 2011026807 A1 * | 3/2011 | | 56/10.2 A |

* cited by examiner

*Primary Examiner* — Mary Cheung
*Assistant Examiner* — Rodney Butler
(74) *Attorney, Agent, or Firm* — Patrick M. Sheldrake

(57) ABSTRACT

A method of cruise control for a harvester automatically monitors certain operating conditions of the harvester and responsively sets an engine speed value adequate to meet predicted torque demand, and, but not necessarily, automatically varies a propulsion speed of the harvester as required to match the torque demand to the available torque to increase efficiency, and has particular applicability to a sugar cane harvester. Monitored conditions can include certain characteristics or parameters of a pump or pumps powering fluid operated systems of the harvester, in particular, propulsion and harvesting systems. Other conditions can include intake air temperature, coolant, and hydraulic fluid temperature. Rate of change of one or more of the conditions can be used for setting the engine speed and to predict the torque demand.

18 Claims, 4 Drawing Sheets

HARVESTER CRUISE CONTROL

TECHNICAL FIELD

The present invention relates to a method for automatically controlling propulsion of a harvester when harvesting, and, more particularly, that continuously monitors certain operating conditions of the harvester to set an engine speed value adequate to meet predicted torque demand, and which automatically varies the propulsion speed of the harvester as required to increase or decrease the actual torque usage so as to match the available torque, and which has particular applicability to a sugar cane harvester.

BACKGROUND ART

It is common practice when operating a self-propelled harvester in its active harvesting or cropping mode, particularly a sugar cane harvester, to operate the engine continuously at a high speed, including its highest speed, to ensure sufficient power and run crop equipments at highest speed. This practice fails to accurately match the engine speed to power demand, which is inefficient and results in less than optimal fuel economy.

On a harvester, engine power, measurable as torque, is commonly distributed amongst numerous systems, particularly, the propulsion system, the harvesting and processing systems, and on a sugar cane harvester, to a chassis height adjustment system that compensates for uneven terrain on a continuous basis during active harvesting. The harvesting and processing systems of a harvester typically include conveyors and choppers that utilize a significant amount of engine torque, but which utilization will vary as a function of several factors, namely, crop density or yield, and cane variety. Occasionally during active harvesting operation, cut crop material will choke or clog elements of the above systems, requiring steps to remove or expel the material causing the choking condition.

At other times, operation of the harvester will require substantially less power. For instance, during stationary idling, and travel with the base cutter or cutters or other harvesting apparatus raised and out of contact with the crop. At these times, operation of the engine at a lower speed is typically more efficient.

Many harvesters include an engine control system operable for managing the engine responsive to harvesting apparatus and conditions to achieve better power management and efficiency. Reference generally, Heisey, U.S. Pat. No. 6,865,870, issued Mar. 15, 2005 to CNH America LLC, which provides a system that provides different overall power levels for different operating modes, e.g., field work verses road travel. There are also known systems that set power levels as a function of equipment connected to the harvester. Several such systems utilize detectors for determining the identity of a header attached to a combine harvester, and provide corresponding stored engine power curves for the particular headers. Reference in this regard, Ehrecke, U.S. Pat. No. 6,397,571, issued Jun. 4, 2002 to Deere and Company. Manufacturers have also devised engine power management schemes for setting available engine power levels as a function of systems of the machine that are currently engaged or operating, e.g., straw chopper, propulsion system, harvester assembly, separator, as indicated by the positions of switches for engaging or activating the respective systems, e.g., the on/off switches for the systems. Reference in this regard, Wyffels, U.S. Pat. No. 5,878,557, issued Mar. 9, 1999 to Deere and Company. Still other engine management schemes rely on sensed measurements of actual power usage of the various systems, for determining available power level values. Reference in this regard, Dickhaus, U.S. Pat. No. 6,073,428, issued Jun. 13, 2000 to Claas Selbstfahrende Erntemaschinen GmbH.

However, an observed shortcoming of setting maximum available power as a function of overall operating mode as suggested above in the first patent, and based on header identity alone, such as proposed in U.S. Pat. No. 6,397,571, is that too much available power may be present in instances when the harvesting and other systems require less power, e.g., crop density or yields are lower, or systems or subsystems are disengaged for a period or intermittently. In this latter instance, removing the power requirements of one or more of the major systems, i.e., turning off or disengaging some of the systems, the balance of subsystems still on or engaged can divide the total available power. In many cases, however, this can result in inefficiency, as the engine is providing more power than is actually necessary for current operating demand.

Setting maximum available power based on the identity of engaged or activated subsystems such as by monitoring on/off switches as proposed in U.S. Pat. No. 5,878,557, also suffers from a shortcoming that it will necessitate setting the available power level to accommodate the maximum expected power usage of those subsystems, and doesn't accommodate reduced power needs of different configurations of the subsystems, and when power demand is temporarily reduced or increased due to changes in crop density, etc.

Setting maximum available power as a function of measured actual usage, as proposed in U.S. Pat. No. 6,073,428, suffers from the shortcoming that the actual power usage can vary significantly during operation as a result of temporary or intermittent operating conditions, again, such as passage through areas of greater or lesser crop density, and passage of slugs of crop material through the crop processing systems, such that the level of available power will be correspondingly varied, reactive to demand, as opposed to in anticipation of demand, which can be problematic. For example, if the actual power usage during an interval of time is relatively low as a result of smooth operating conditions, the available maximum engine power may be set to reflect this. But, when an increase in power demand occurs, the additional engine power available may be inadequate. Then, if in response the system automatically or the operator manually increases power, after the need for the additional power has passed, the now available power may be too great, which is inefficient.

Thus, what is sought is a manner of power management that efficiently delivers necessary power to systems and subsystems of a harvester in a responsive and efficient manner, particularly when actively harvesting, and adaptable to the power demands of a sugar cane harvester.

SUMMARY OF THE INVENTION

What is disclosed is a manner of power management configured as a cruise control, that efficiently delivers necessary power to systems and subsystems of a harvester in a responsive and efficient manner, particularly when harvesting, adaptable to the power demands of a sugar cane harvester. In particular according to the invention, the cruise control automatically sets engine speed as a function of determined torque demand, which is determined as a function of at least one monitored condition. The target is to keep engine speed in an intermediate value close to the maximum torque available but far from the maximum engine speed in order to save fuel and just allow to increase this value under certain conditions but just enough to manage a temporary situation. The cruise control then automatically varies the propulsion speed of the harvester on a continuing basis as required such that the actual torque demand substantially matches or equals the actual torque output of the engine. High efficiency is achieved as a result of the torque demand being equal to the available torque for the engine speed settings and reducing the parasitic losses which means all those represented by the harvester equipments running free when nothing is being cropped.

According to a preferred method of cruise control, steps include:

monitoring the percentage of torque informed by the ECM (engine control module) representative of torque demand on an engine of the harvester, while controlling a speed of the engine and, but not mandatory, operating systems of the harvester;

determining a value representative of a predicted torque demand on the engine as a function of the monitored conditions;

setting the speed of the engine at a value so as to produce an outputted torque sufficient to meet the predicted torque demand; and automatically varying a propulsion speed of the harvester as required to substantially continuously equalize the torque demand to the outputted torque.

According to another preferred aspect of the invention, the monitored conditions include a characteristic parameter or parameters representative and/or predictive of torque demand or utilization, which may be different for different harvesters, depending on one or more conditions. As a non-limiting example, for a sugar cane harvester or other harvester having both propulsion and crop cutting systems that are fluid powered, a parameter or parameters of the base cutter or cutters, chopper and feed rollers position and/or pressure can be used to control the forward speed and so as a consequence are significant or controlling factors in the torque demand. These systems are powered by a hydraulic pump or pumps and certain pump parameters, particularly, swash plate angle, has been found to have utility as a reliable indicator of the torque demand of these systems. Another parameter or parameters must be controlled or monitored since the engine speed is reduced and this can affect the cooling capacity. Reliable indicators or predictors of this condition are hydraulic fluid temperature, air intake temperature, and coolant temperature.

As another preferred aspect of the invention, required engine speed values for each of the respective conditions can be determined or calculated, including as a function at least in part, on acceleration factors for one or more of the conditions, and the highest required engine speed requirement for the conditions selected and used as the speed setting.

As another preferred aspect of the invention, values for, or representative of, torque demand for the various pump conditions and for cooling demand as a function of hydraulic fluid and intake air temperatures, and torque output for the different engine speed settings can be determined from look up tables or calculated.

Also, because the propulsion speed of the harvester is automatically decreased responsive to a determination that the predicted or actual torque demand or usage is or will exceed the torque capacity, and is automatically increased if additional torque is available, engine torque utilization is closely matched to available torque, so that undesirable conditions such as engine bogging and degradation of operating systems including the propulsion and harvesting systems are automatically avoided and fuel efficiency is improved.

According to another preferred aspect of the invention, automatically adjusting the propulsion speed of the harvester in the above-described manner will be performed only when the harvester is harvesting. As another preferred aspect, when not in a harvesting mode, the operating speed of the engine will automatically be set to a different value appropriate for non-harvesting operations. As a non-limiting example, if non-movement for a selected time is detected the engine speed can be reduced to idle range to conserve fuel. And if the harvesting apparatus, e.g., base cutter of a cane harvester, is raised to a non-harvesting position, or indication of a non-harvesting mode is received, engine speed is automatically reduced to conserve fuel.

As another preferred aspect of the invention, when in the cruise control mode with the engine operating at a set speed, if the pump swash plate is at its maximum angle providing maximum fluid flow, the engine speed is automatically increased to increase the fluid flow so as to maintain desired operation of the fluid powered systems, and when the swash plate is no longer at maximum angle the engine speed is automatically reduced.

As another preferred aspect of the invention, the harvesting system is monitored to determine if a reversing system is engaged, and, if yes, and the engine is operating at a speed less than a maximum speed, then the engine speed is automatically increased to the maximum speed, to facilitate removal of any crop blocking or choking the harvesting system. The method of the invention can also automatically reduce the speed to the previous or another lower value when the blockage is gone and resume operation in the cruise control mode.

DETAILED DESCRIPTION OF THE INVENTION

Figure 1:
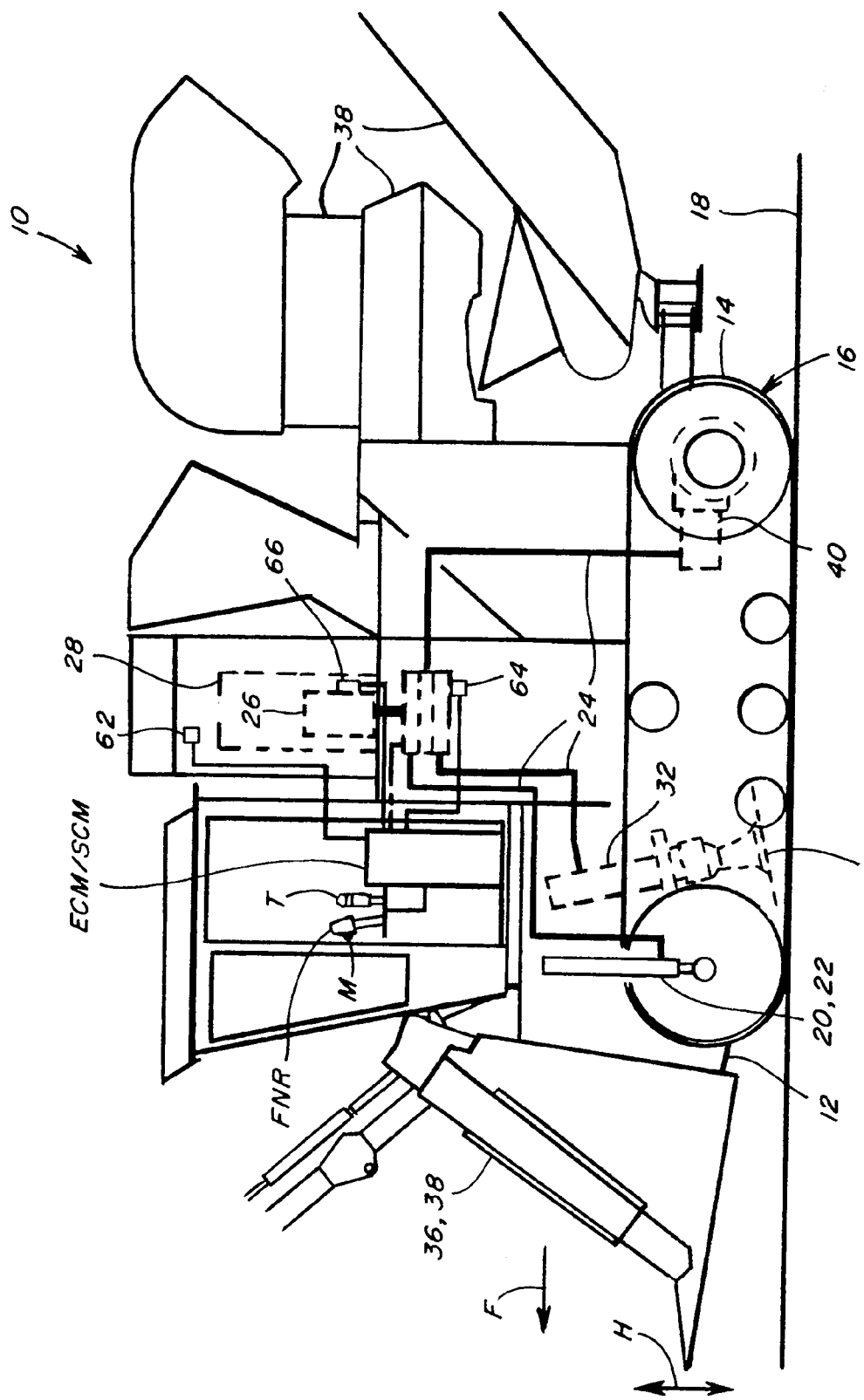
FIG. 1 is a partial side view of a representative harvester which is a sugar cane harvester, operable in accordance with a method of the present invention.

Referring now to the drawings wherein like numbers refer to like items, FIG. 1 depicts, in a partial side view, a representative harvester 10, which is a sugar cane harvester, generally of known construction, having a chassis 12 supported by tracks 14 (or tires) of a propulsion system 16 upon a ground surface 18. Torque using systems of harvester 10 include a chassis height adjustment system 20 which here uses double acting hydraulic cylinders 22 that connect chassis 12 to tracks 14 and which operate under control of an elevation controller unit of the system for varying the height of the front end of chassis 12 relative to ground surface 18, as denoted by arrow H. This uses pressurized hydraulic fluid directed by a controller and valves of system 20 via lines 24 connecting with the cylinders 22. The pressurized hydraulic fluid is supplied by a hydraulic pump or pumps 26 driven by an engine 28 of harvester 10 disposed on chassis 12, in the well known manner. System 20 thus consumes torque of engine 28 via pump or pumps 26.

A set of side by side base cutter units 30, which may also be of any well known design and operation, or of any other design that operates to the same purpose, are shown supported from chassis 12. In the preferred embodiment depicted, each base cutter unit 30 includes a hydraulic motor 32, supplied with pressurized hydraulic fluid by a pump or pumps 26 via lines 24, which drives a rotary cutter disk 34 equipped with cutting knives for cutting sugar canes at a desired short distance above ground surface 18, as harvester 10 is moved forwardly thereover, as denoted by arrow F.

Associated with base cutter units 30 may be a pressure sensing system (not shown) operable to automatically monitor the hydraulic pressure in base cutter units 30. When the rotary disk cutter 34 encounters increased resistance to cutting, such as due to an encounter with a localized elevation of the ground surface (also a large amount of cane), an increased load is placed on the hydraulic motor 32. This will cause the hydraulic fluid pressure to increase. This may result in an increase in the load on pump or pumps 26 and consequently, increased torque demand on engine 28. To reduce or avoid damaging the cutters and drive trains of base cutter units 30, the pressure sensing system can output a signal to a controller of the chassis height adjustment system 20, which can respond by automatically raising chassis 12 and thus base cutter units 30, to reduce the pressure.

As a summary of the effects of the above systems, it should be understood that the power demands of base cutter units 30 on engine 28 can vary considerably during operation of the harvester, e.g., as a function of factors, including, but not limited to, crop density, moisture content, toughness, cane diameter, etc., including significantly over the length of a single swath of a typical field.

Figure 4:
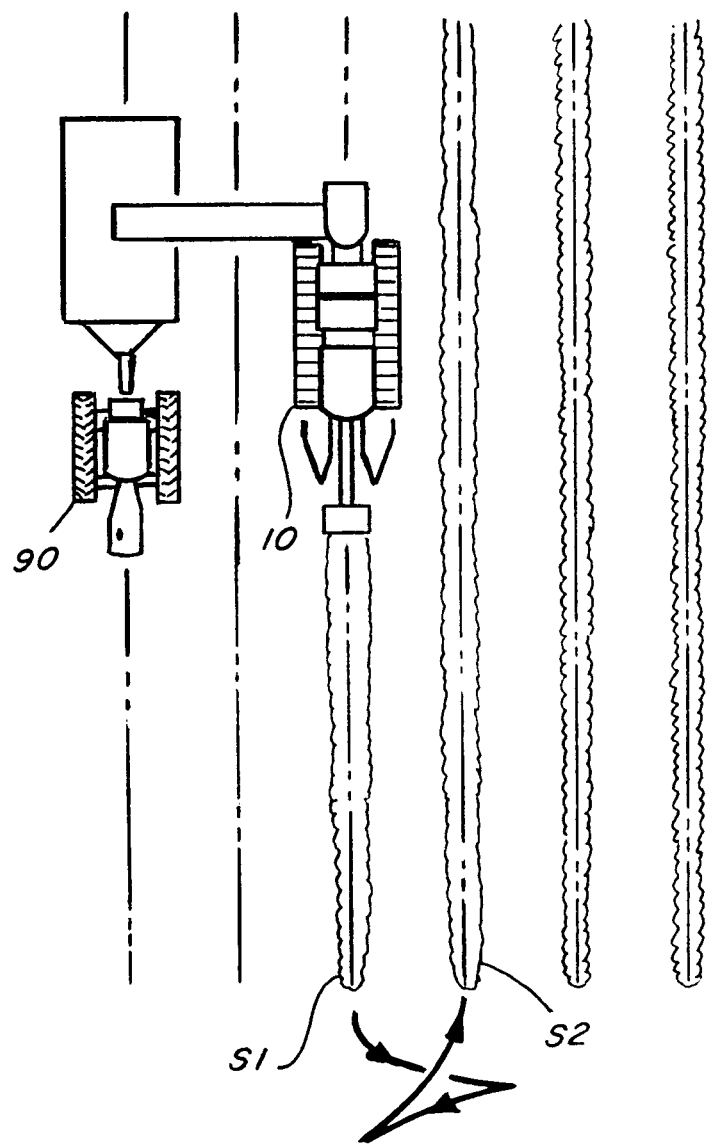
FIG. 4 is a top view showing the harvester of FIG. 1, harvesting cane from a field, accompanied by a tractor towing a wagon for receiving the harvested cane, and illustrating with arrows, a turning maneuver of the harvester at the end of the field.

Additionally, base cutter units 30 operate in cooperation with other elements of harvesting system 36 of harvester 10. Such elements generally include crop processing and conveying apparatus 38 of well known construction and operation for receiving the cut canes, conveying them onto chassis 12, chopping the canes, and holding the chopped canes or conveying them to an accompanying vehicle, such as a wagon towed by a truck or tractor 90 (FIG. 4). Processing and conveying apparatus 38 of harvesting system 36 can be powered directly by engine 28 in any suitable manner, such as, but not limited to, via one or more gearboxes and/or transmissions, belts, chains, drive shafts, etc., or indirectly, such as hydraulically by one or more hydraulic motors supplied by pump or pumps 26 driven by engine 28, in the well known manner or otherwise. As with base cutter units 30, the resulting torque load on engine 28 can vary substantially during harvesting operations, including significantly over the course of travel over a single swath of a field, as a function of the above noted conditions, such as crop density, moisture content, toughness, etc.

Propulsion system 16 of harvester 10 here is hydraulically powered by fluid motors 40 on each side of the harvester and supplied pressurized fluid from pump or pumps 26 driven by engine 28, via fluid lines 24. Fluid motors 40 are connected in driving relation to tracks 14, and operate in the well known manner. Alternatively, propulsion system can be directly driven by engine 28 via a transmission, gears, chains, or the like. In operation, the torque load on engine 28 from the propulsion system can vary, for instance, as a result of factors that can include, but are not limited to, variations in crop density and moisture content, slope or grade being traversed, and hardness and/or moisture content of the ground.

Particularly during harvesting operation when propulsion system 16, height adjustment system 20, base cutter units 30, and harvesting system 36 are operating, the combined torque demand on engine 28 from these systems can vary significantly and unpredictably. Additionally, the varying demand on pump or pumps 26 by the hydraulically powered systems can vary the temperature of the hydraulic fluid circulating in those systems. Harvester 10 includes a cooling system including a radiator or radiators for cooling the hydraulic fluid and also the engine, and a fan or fans operable to produce air flow through the radiator or radiators, in the well known manner. The fan or fans of the cooling system can be directly powered by the engine, or indirectly via a belt or a fluid motor or motors driven by pump or pumps 26, also in the well known manner.

Typically, pump or pumps 26 on a harvester such as harvester 10, will automatically vary in displacement via a variable angle swash plate, in the well known manner. In operation, the pump or pumps will be tasked with providing a certain hydraulic system flow and pressure, and the system controller, e.g., the SCM, will automatically vary the swash plate angle to maintain that flow, the pressure will change according the torque demand. In operation, one or more of the fluid powered systems may have high fluid demand, and one or more may have low fluid demand, such that the resulting pump load on engine 28 can very significantly.

Figure 2:
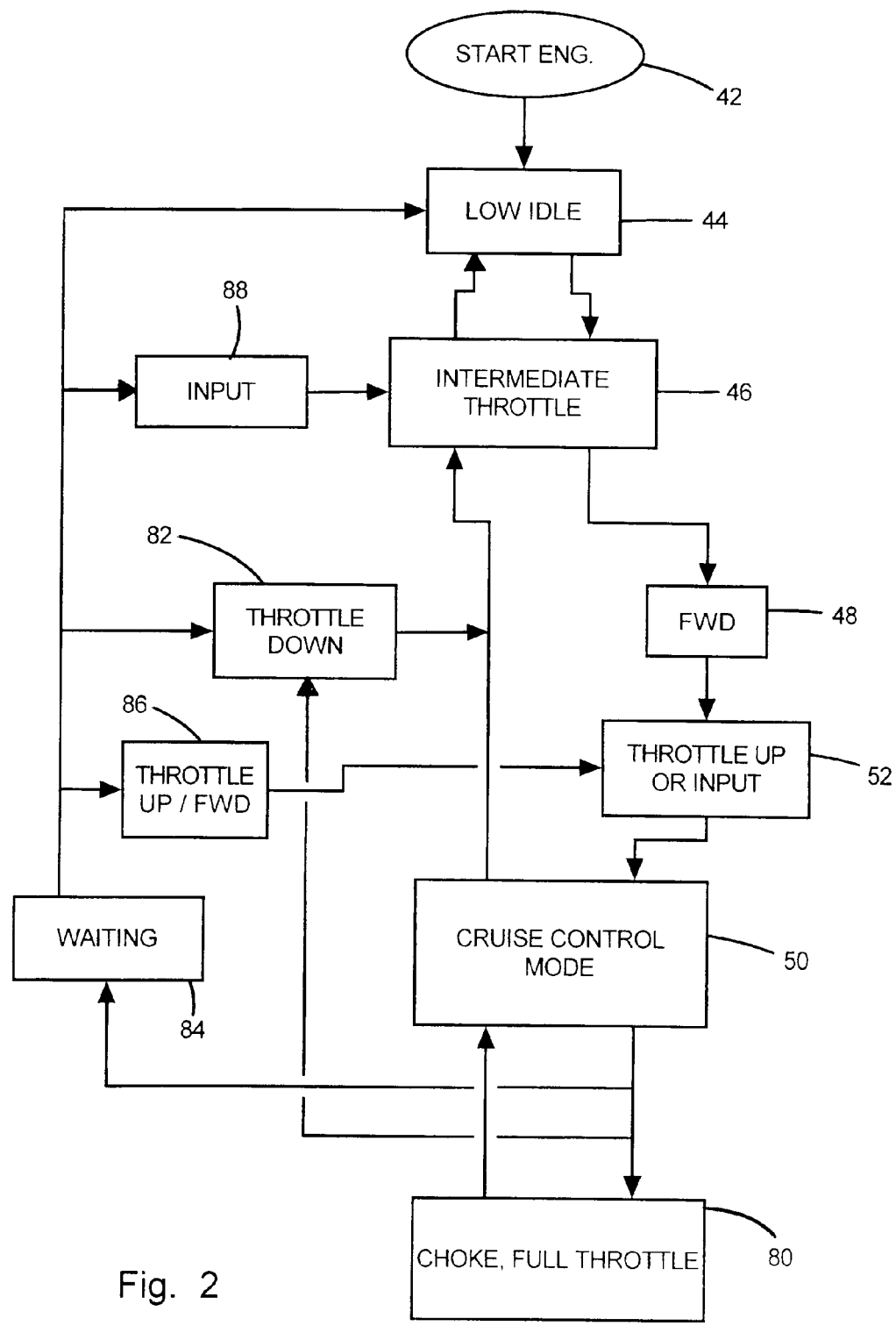
FIG. 2 is a diagrammatic representation of elements of the method of the invention.
Figure 3:
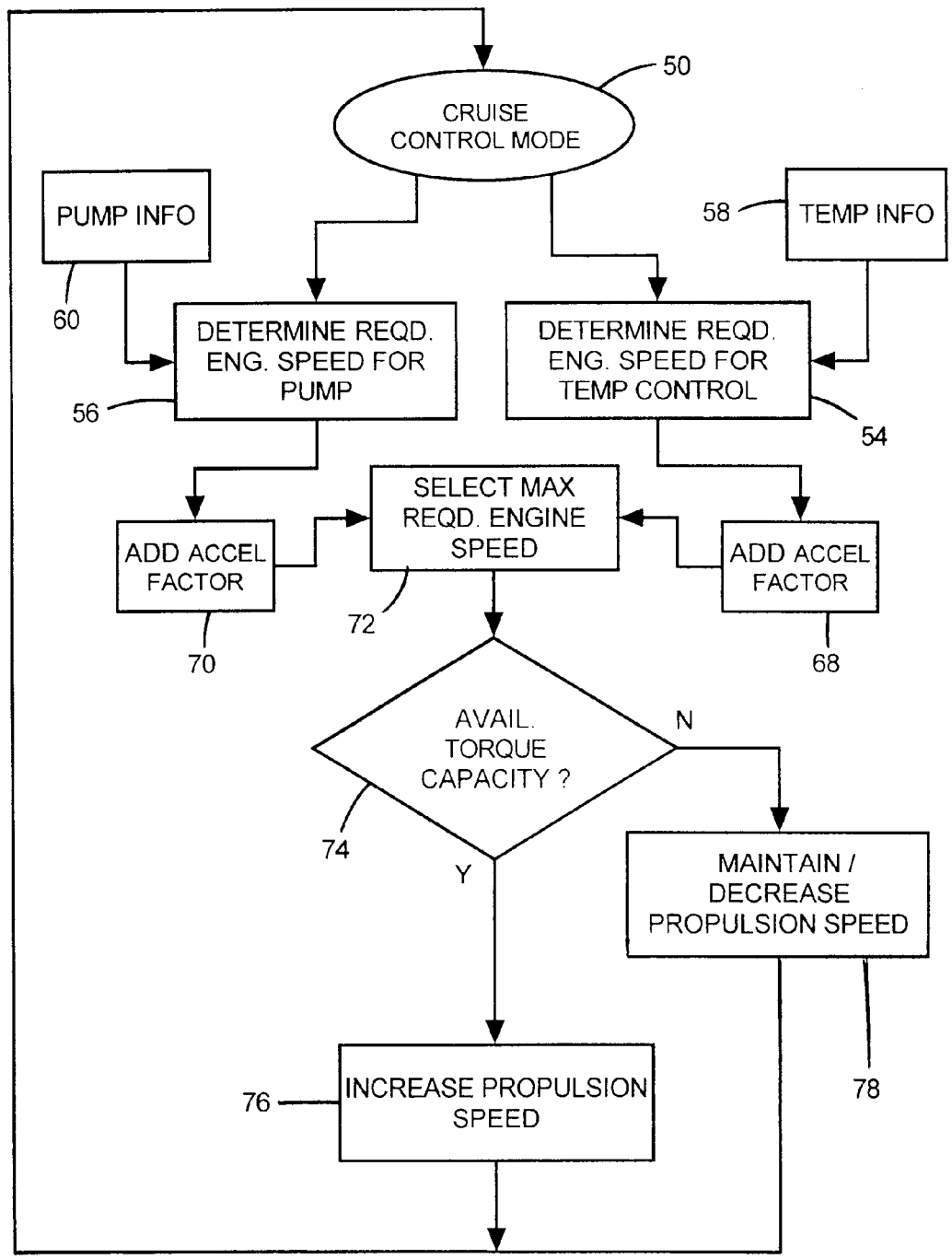
FIG. 3 is a further diagrammatical representation of elements of the method of the invention.

Referring also to FIGS. 2 and 3, the present invention resides in a method of cruise control that sets the engine speed in an intermediate value which is a compromise between fuel economy and torque availability and automatically keeps this point of operation unless a different level of torque will be required by the harvester system and, for maximizing utilization of available engine torque. The method of the invention will be performed automatically by one or more processor based control devices, which can be the engine control module ECM, and/or a system control module SCM, which can be located on harvester 10 as generally illustrated in FIG. 1, or remotely located and in communication with the harvester via a suitable communications link.

Referring particularly to FIG. 2, as denoted by blocks 42 and 44, as a general operating scheme, when engine 28 is started, with the throttle control T in its lowest position and the propulsion or FNR control (FIG. 1) in its neutral position, the engine will be automatically operated at a low idle speed, for instance, about 800 rpm. The throttle control T can then be positioned at a desired setting, as denoted by block 46 and the FNR input control operated as desired, e.g., forward, neutral, reverse, by the operator for moving the harvester, e.g., to or over a field or the like, in a desired direction and at a desired speed.

System rules or conditions required for entry into the cruise control mode can be established as required to achieve the desired efficiency. Here, conditions will preferably comprise at least an intermediate throttle value, e.g., about 1800 rpm, as also denoted at block 46, with the FNR control in a forward drive mode or position, as denoted by block 48. As another condition, harvesting system 36 will be required to be in the active harvesting or forward mode. The cruise control mode, denoted by block 50, is then initiated as denoted by block 52, either by increasing throttle T, or using a predetermined input command, such as operation in a predetermined manner of a designated input device such as a button M or the like, located for instance, on the FNR control (FIG. 1).

Referring more particularly to FIG. 3, when the cruise control mode is initiated, as denoted by block 50, the SCM will automatically determine and set a suitable initial engine speed for the engine torque load. This can be an existing value, a predetermined value, e.g., 1800 rpm, or it can be determined and automatically set as a function of one or more of several conditions so as to more accurately or closely reflect torque demand on the engine. Conditions found to be reliable indicators of engine torque demand include the temperature of the hydraulic fluid (indicative/predictive of cooling load), intake air temperature (same), and one or more operating parameters of pump or pumps 26 (indicator of fluid operated system loads, e.g., propulsion system 16 and base cutter units 30). Preferably, a required engine speed will be determined for each of the conditions, as denoted by blocks 54 and 56, using temperature information and pump information inputted respectively to the SCM, as denoted by blocks 58 and 60.

As non-limiting examples, intake air temperature information can be inputted to the SCM by an intake air temperature sensor 62; hydraulic fluid temperature by a hydraulic fluid temperature sensor 64 in connection with a fluid reservoir, radiator, line, etc.; and pump information, particularly swash plate angle, from an appropriate pump sensor or sensors 66 in connection with pump or pumps 26, all as illustrated in FIG. 1. These sensors can be connected to SCM and/or ECM in a suitable manner, such as by wires of a wiring harness, or a wired or wireless network, in the well known manner.

Returning to FIG. 3, additionally, rates of change, and particularly acceleration of the different conditions, that is, hydraulic fluid temperature, intake air temperature, pump swash plate angle, have been found to have utility for increasing the accuracy of predicted engine torque loads. As a result, this information is preferably also factored into the determination of the required engine speed settings for each of the conditions, as denoted by blocks 68 and 70. After the required engine speeds for each of the conditions is determined, the maximum or highest one of those speeds is selected as the next setting for the engine speed, as denoted by block 72, and the ECM will be commanded by the SCM to set the engine speed to that value. Additionally, if the set value is significantly different than the current value, a value for a rate of change of the engine speed to the new set value can optionally be selected, such as, but not limited to, 50 to 250 rpm per second, which can be a function of the rate of change or acceleration of the condition for which the new speed setting is selected.

In regard to swash plate angle, if it is determined that swash plate angle is at a maximum value or setting providing maximum flow, to avoid reduction in the performance of the fluid powered systems of the harvester, the engine speed will be automatically increased to increase fluid flow, and automatically reduced when the swash plate angle is reduced.

Next, it is determined if, at the set engine speed, there is or will be any available torque capacity, as denoted by decision block 74. That is, it is determined whether the torque demand on the engine from pump or pumps 26, and the harvesting and other systems driven by engine 28, substantially matches or equals the torque output of engine 28, such that there is no available torque capacity; or, the outputted engine torque exceeds the demand, such that there is available torque capacity. If there is available torque capacity, that is, the outputted torque is predicted to exceed actual torque demand, the SCM will automatically command an increase in the propulsion speed of the harvester, as denoted in block 76, to an extent so as to consume the available torque capacity and thus substantially equate the torque demand to the torque output of the engine. If there is no available toque capacity, that is, the outputted torque substantially equals torque demand, the SCM will maintain the propulsion speed; and optionally, if it is predicted or determined that the torque demand would exceed the torque output, or the engine begins to bog, the propulsion speed can be automatically decreased to reduce or avoid decrease in performance of one or more of the operating systems of the harvester, as denoted in block 78. In both instances, if still in the cruise control mode, the SCM will loop back to block 50 to repeat the above steps.

Referring again in particular to FIG. 2, operation in the cruise control mode can be automatically ceased or discontinued under certain conditions, or by a predetermined operator command such as pressing button M (FIG. 1) twice. As one of the conditions, in the event of a choke condition in harvesting system 36, the operator or SCM may engage a reversing system of the harvesting system, to reverse movement of cut crop material through apparatus 38 to remove or expel the material causing the choke. When this occurs, the SCM will automatically command the ECM to increase the engine speed to its full throttle value, e.g., 2100 rpm, as denoted by the arrow extending from block 50 to block 80. Then, if the reversing system is again reversed, to continue operation in the normal harvesting manner, operation in the cruise control mode, denoted by block 50 is automatically resumed.

Alternatively, if the reversing system is engaged, but the engine is throttled down by the operator, as denoted by block 82, the cruise control will be automatically exited, and then following the arrow to block 46, the operator will need to increase the throttle to an intermediate value to enable reentering the cruise control mode via the path of blocks 48 and 52. As another alternative, if after the reversing system is engaged, the operator fails to input a throttle command, the SCM will wait a predetermined time, e.g., 15 seconds, as denoted at block 84, and automatically reduce throttle to a low idle, as denoted by the arrow to block 44. If, as this is occurring, the operator throttles up with the FNR control in forward, as denoted at block 86, the cruise control mode may be reentered if the throttle up reaches the value required for entry, and optionally the required command, e.g., pushing button M, is inputted, as denoted at block 52. As another possibility, if after waiting (block 84) the operator inputs a throttle down command, as denoted by block 82, reentry into the cruise control mode can be accomplished by execution of the steps of blocks 46, 48 and 52. Additionally, exit from the cruise control mode can be easily accomplished in any of several predetermined manners, such as by pressing button M twice in succession, by movement of the FNR control to the N or R positions, or by throttling down to an intermediate throttle position as denoted by the arrow from block 50 to block 46. Additionally, the cruise control mode can be exited or suspended, by raising cutter units 30.

Referring also to FIG. 4, to illustrate an operating advantage of the invention in the latter regard above, as a harvester 10 is operating in the cruise control mode and reaches the end of a swath S1 of a field, there may not be adequate room to execute a simple U-shape turn at speed. Still in the cruise control mode, the operator can input the command to raise the base cutter units 30. This can be used to trigger a suspension of operation in the cruise control mode, and allow operation of the FNR control (FIG. 1) to execute a turn involving a complex maneuver as denoted by the arrows, a turn to the left, followed by a reversal toward the right, and then a left turn in the opposite direction onto the next swath S2. During these maneuvers the throttle can remain in the same position or be changed by the operator as desired or required. Once harvester 10 is traveling along swath S2, cruise control can be resumed with a predetermined command, such as a press of button M (FIG. 1) and a return to the minimum intermediate throttle position, e.g., 1800 rpm if necessary.

It will be understood that the foregoing descriptions are for preferred embodiments of this invention and that the invention is not limited to the specific forms shown. Other modifications may be made in the design and arrangement of other elements without departing from the scope of the invention as expressed in the appended claims.

What is claimed is:

1. A method for cruise control of a harvester, comprising steps of:

monitoring certain operating conditions of the harvester representative of torque demand on an engine of the harvester, while controlling a speed of the engine and operating systems of the harvester;

determining a value representative of a predicted torque demand on the engine as a function of the monitored conditions;

setting the speed of the engine at a value so as to produce an outputted torque sufficient to meet the predicted torque demand;

automatically varying a propulsion speed of the harvester as required to substantially continuously equalize the torque demand to the outputted torque; and monitoring a harvesting system of the harvester to determine if the harvesting system is in a harvesting mode, and, if no, then ceasing the step of automatically varying the propulsion speed.

2. The method of claim 1, wherein the step of automatically varying the propulsion speed comprises increasing the propulsion speed when the torque demand is less than the outputted torque.

3. The method of claim 1, wherein the step of automatically varying the propulsion speed comprises decreasing the propulsion speed if the predicted torque demand is greater than the outputted torque.

4. The method of claim 1, wherein the step of automatically varying the propulsion speed comprises increasing the propulsion speed if the predicted torque demand is less than the outputted torque.

5. The method of claim 1, wherein the step of varying the propulsion speed of the harvester is performed only when the harvester is harvesting.

6. The method of claim 1, wherein the speed of the engine is set as a function of at least one of the monitored conditions.

7. The method of claim 6, wherein the monitored conditions comprise at least one temperature value and a swash plate angle of a pump.

8. The method of claim 6, wherein the monitored conditions comprise a rate of change of at least one of the monitored conditions.

9. The method of claim 8, wherein the at least one of the monitored conditions comprises a swash plate angle of a pump.

10. A method for cruise control of a harvester, comprising steps of:

monitoring certain operating conditions of the harvester representative of torque demand on an engine of the harvester, while controlling a speed of the engine and operating systems of the harvester;

determining a value representative of a predicted torque demand on the engine as a function of the monitored conditions;

setting the speed of the engine at a value so as to produce an outputted torque sufficient to meet the predicted torque demand;

automatically varying a propulsion speed of the harvester as required to substantially continuously equalize the torque demand to the outputted torque; and comprising a further step of monitoring a harvesting system of the harvester to determine if a reversing system of the harvesting system is engaged, and, if yes, then automatically ceasing the step of automatically varying the propulsion speed of the harvester, and setting the speed of the engine to a maximum value.

11. The method of claim 1, wherein the harvester comprises a sugar cane harvester.

12. A method of cruise control for a harvester while harvesting, comprising steps of:

automatically monitoring conditions of operating systems of the harvester and setting an engine speed of the harvester to a value as a function of at least one of the monitored conditions; and automatically continually determining a value representative of available torque capacity of the engine and increasing or decreasing a propulsion speed of the harvester as required so as to substantially maximize utilization of the available torque capacity; and monitoring a harvesting system of the harvester to determine if a reversing system of the harvesting system is engaged, and, if yes, then automatically ceasing the step of automatically varying the propulsion speed of the harvester, and automatically setting the speed of the engine to a maximum value.

13. The method of claim 12, wherein the monitored conditions comprise an intake air temperature, a hydraulic fluid temperature, and a parameter of at least one pump of the harvester.

14. The method of claim 12, wherein at least one of the monitored conditions comprises a rate of change.

15. The method of claim 12, wherein the monitored conditions comprise an intake air temperature and a rate of change thereof; a hydraulic fluid temperature and a rate of change thereof; and a swash plate angle of the at least one pump of the harvester and a rate of change thereof.

16. The method of claim 12, wherein the harvester comprises a sugar cane harvester.

17. A method for cruise control of a sugar cane harvester, comprising steps of:

monitoring certain operating conditions of a base cutter system or a height control system of the harvester representative of torque demand on an engine of the harvester, while controlling a speed of the engine and operating systems of the harvester;

determining a value representative of a predicted torque demand on the engine as a function of the monitored conditions;

setting the speed of the engine at a value so as to produce an outputted torque sufficient to meet the predicted torque demand; and automatically varying a propulsion speed of the harvester as required to substantially continuously equalize the torque demand to the outputted torque.

18. The method of claim 17, monitoring conditions comprise an intake air temperature, a hydraulic fluid temperature, and a parameter of at least one pump of the harvester powering the base cutter system.

* * * * *